UNITED STATES PATENT OFFICE.

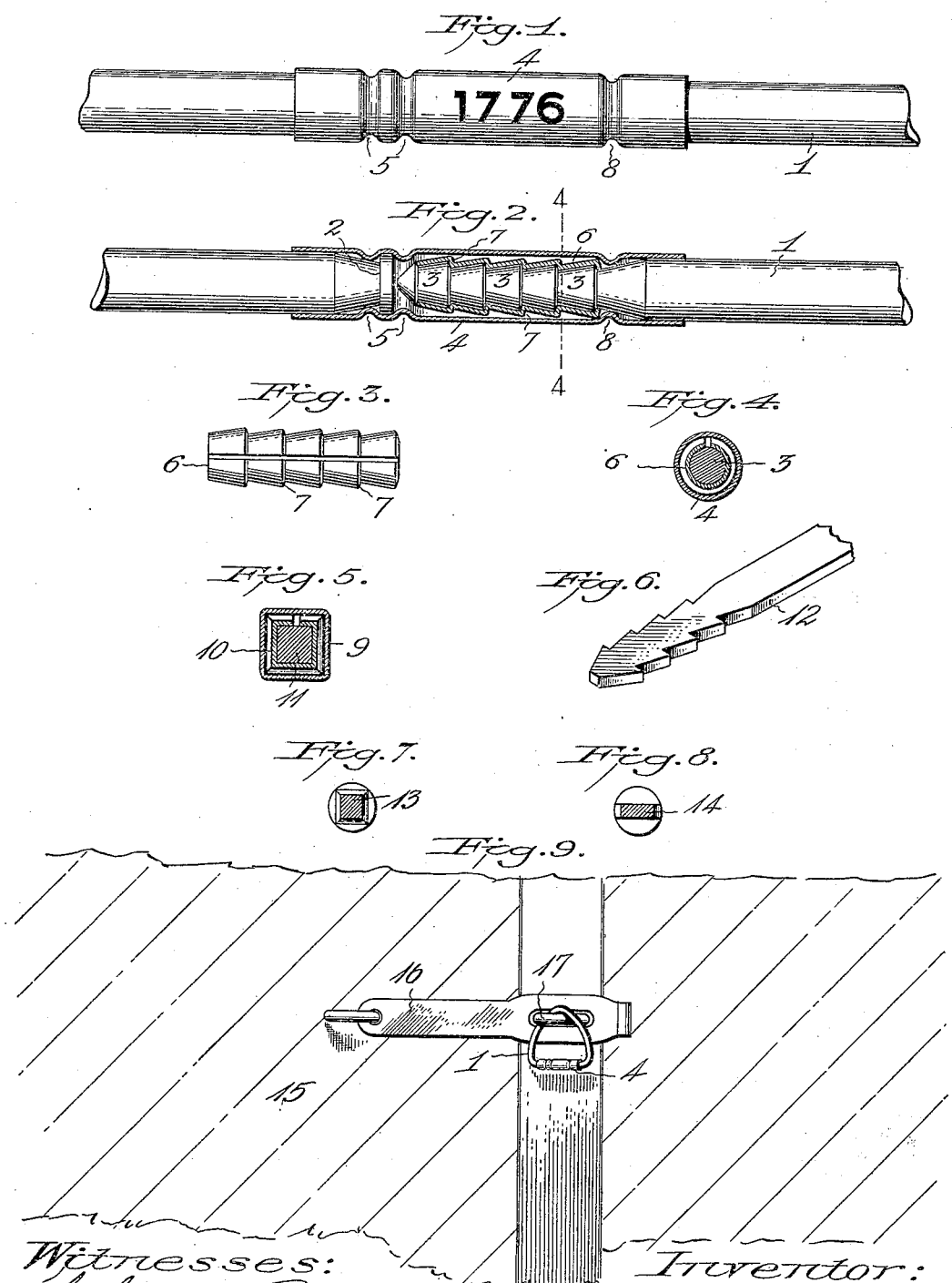

JOHN J. A. MILLER, OF DENVER, COLORADO.

SEAL FOR CAR-DOORS, SHIPPING-RECEPTACLES, &c.

932,159.  Specification of Letters Patent.  Patented Aug. 24, 1909.

Application filed February 2, 1909. Serial No. 475,615.

*To all whom it may concern:*

Be it known that I, JOHN J. A. MILLER, a citizen of the United States of America, residing at the city and county of Denver and State of Colorado, have invented a new and useful Seal for Car Doors, Shipping-Receptacles, &c., of which the following is a specification.

My invention relates to improvements in seals for cars, crates, boxes, bags, baskets, and other produce holding and shipping receptacles, and the objects of my invention are: First, to provide an automatically self locking and non-unlocking seal for all characters of merchandise and produce holding and shipping cars, boxes, crates, bags, and other receptacles. Second, to provide a loop or ring-shaped wire or chain or ribbon seal, the ends of which can be locked in unlockable relation to each other, and that can only be separated by breaking or cutting the wire loop. And third, to provide a simple, strong, durable, and quickly attachable seal. I attain these objects by the mechanism illustrated in the accompanying drawings, in which:

Figure 1, is a side elevation of the improved seal, on a greatly enlarged scale, a portion of the loop or ring only being shown. Fig. 2, is a longitudinal sectional view through the seal, the locking end being in engagement with the locking sleeve. Fig. 3, is a side view of the locking sleeve. Fig. 4, is a transverse, sectional view on the line 4—4 of Fig. 2. Fig. 5, is a transverse, sectional view showing a seal which is square in cross section. Fig. 6, is a view of the locking end of a flat band or loop, which is used in connection with a correspondingly shaped locking sleeve. Fig. 7, is a transverse, sectional view, showing a loop round in cross section, and having a square locking end. Fig. 8, is a transverse, sectional view, showing a loop round in cross section, and having a flat locking head. And Fig. 9, is a front elevation, showing the application of the loop to a car door.

Similar numerals of reference refer to similar parts throughout the several views.

Referring to the drawings, my improved seal consists of a loop or ring-shaped body portion 1, which I preferably make of wire, but my invention contemplates the use of a short piece of chain or of a metal ribbon or any other suitable flexible material for this body portion. The loop portion is provided at one end with a flange 2, which is formed by reducing the diameter of the adjoining portion of the loop, and upon the other or key end is formed a plurality of annular shoulders 3, whose outline in longitudinal section is substantially like a series of saw teeth. I preferably make the loop out of annealed brass, copper, white-metal, iron or other soft wire, and the size of the wire may vary to suit the various uses and sizes of articles to which the seal is applied, but for general purposes the loop is made of wire about one-eighth of an inch in diameter, and as long as conditions may require. Upon the end of the loop having the flange 2, is placed a tubular head 4, of suitable length, and this head or tube is held upon the loop by forming an annular groove 5 on each side of the flange 2, by which the flange is tightly engaged and endwise movement of the tube upon the loop is prevented. Within the tubular head is placed a split resilient sleeve 6, which is formed with annular shoulders 7, similar to the shoulders 3, on the key end of the loop, the metal of the sleeve being compressed in forming these shoulders, so that in longitudinal section it would resemble saw teeth, each outer shoulder having its corresponding inner shoulder.

The outer end of the split sleeve terminates in a shoulder, and the sleeve is held within the tubular head by forming a circumferential groove 8, in the said head, immediately in the front of the end of the sleeve, which forms an abutment against which the end of the sleeve bears.

The circular ratchet toothed shaped shoulders of the split sleeve are preferably arranged with their beveled side converging from the outer end of the sleeve toward its inner end, and the circular ratchet toothed shaped shoulders of the key end of the loop are arranged to match and engage the shoulders of the sleeve, when the said key end is inserted in the sleeve. Consequently these sides of the ratchet shaped shoulders of both the sleeve and the key form circumferential square shoulders on each ratchet toothed portion of both the sleeve and the locking key. The locking key stem is made with a pointed end and is made of a size that will push into the lock entrance of the head and into the sleeve and will expand the sleeve by its upward inclined sides of its circular ratchet shoulder portions sliding against the downward inclined surface of the ratchet shoulders of the interior of the sleeve, and sliding over them as it is pushed into the head and sleeve until it is wholly within the head and sleeve, when its square shoulders bear against the square shoulders of the sleeve, the forward end of which strikes against the shoulder or groove 8, in the head, and it cannot be pulled out of the head, and the locking key cannot be pulled out of the sleeve. Consequently the loop shaped seal cannot be opened except that the wire forming the loop of the seal be either broken by a lever or cut with pliers or a chisel.

I preferably make the seal of a length of wire that will form a loop or ring large enough to be locked easily to staples or rings of cars, crates, boxes, or bags, to which it is to be attached, and to attach it to seal the cover or door or lid of any box, crate, bag, or car it is only necessary to insert one end through staples or rings attached and arranged on them to receive it, and then push the key end of the loop into the head of the seal as far as it will go, when it locks itself automatically to the sleeve within the head.

Each seal or each series of seals used from different shipping points is preferably given a number, which may be stamped in the metal or be otherwise affixed to either the head or loop portion of the seal.

In Fig. 5, is illustrated a seal having a square head 9, and a correspondingly shaped locking sleeve 10, and key end 11.

Fig. 6, shows a flat key end 12, which may be used with a correspondingly shaped head and locking sleeve; while Figs. 7 and 8 show cross sections of round loops, the former having a square locking or key end 13, while the latter is provided with a flat key end 14.

In Fig. 9, a car door 15, is shown, having a hasp 16, which is locked to a staple 17 by the improved seal; it being obvious that the seal must be destroyed in order to open the door.

Having described my invention, what I claim as new and desire to secure by Letters Patent, is:

1. A seal, comprising a loop or ring-shaped body portion, having at one end a tubular head, a split expanding ratchet toothed sleeve in said tubular head, means for confining said sleeve in said tubular head, and a ratchet toothed terminal portion on the opposite end of said body portion, arranged to be forced into and to be locked to the ratchet teeth of said sleeve.

2. A seal, comprising a loop of a suitable material provided with a lock end portion at one end and a locking key portion at its opposite end, said lock end of which is provided with an aperture extending into its end, a split expansible circumferentially shouldered sleeve provided with interiorly arranged circumferential beveled shoulders, means for securing said sleeve in said lock end against displacement, said locking key being provided with corresponding beveled teeth falling in and registering with the sleeve of said locking key portion and arranged to be pushed into said lock end portion and into said sleeve, and adapted to expand said sleeve and fit into and against its shoulders and lock itself permanently to said sleeve against displacement.

3. In a seal as described, a wire of suitable dimensions, having a plurality of abrupt shoulders formed upon one end and a flange on its other extremity; a tube on the flanged end of the wire, and abutments formed by grooving said tube on each side of the flange, whereby the tube is held upon the end of the wire; an expansible sleeve within the tube formed with abrupt shoulders, which are adapted to engage the shoulders on the opposite end of the wire, when the same is inserted in the tube, and prevent its withdrawal, and an abutment in the front of the sleeve, formed by grooving the tube, to prevent the withdrawal of the sleeve.

In testimony whereof I affix my signature in presence of two witnesses.

JOHN J. A. MILLER.

Witnesses:
G. SARGENT ELLIOTT,
ADELLA M. FOWLE.